(12) United States Patent
Rengasamy et al.

(10) Patent No.: US 12,313,074 B1
(45) Date of Patent: May 27, 2025

(54) EFFICIENT SYSTEM FOR PUMPING LOW-DENSITY LIQUIDS

(71) Applicant: Flowserve Pte. Ltd., Singapore (SG)

(72) Inventors: Ramakrishnan Rengasamy, Fogelsville, PA (US); Sean A. Cain, Tulsa, OK (US); Andreas Dreiss, Geestland (DE)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 18/437,855

(22) Filed: Feb. 9, 2024

(51) Int. Cl.
  *F04D 13/14* (2006.01)
  *F04D 7/02* (2006.01)
  *H02K 21/24* (2006.01)

(52) U.S. Cl.
  CPC .............. *F04D 13/14* (2013.01); *F04D 7/02* (2013.01); *H02K 21/24* (2013.01)

(58) Field of Classification Search
  CPC . F04D 13/14; F04D 13/06; F04D 1/06; F04D 7/02; F04D 29/66
  See application file for complete search history.

(56) References Cited

U.S. PATENT DOCUMENTS

| | | |
|---|---|---|
| 1,632,357 A | 6/1927 | White |
| 1,949,796 A | 3/1934 | Himmel |
| 2,438,629 A | 3/1948 | Anderson |
| 2,440,947 A | 5/1948 | Hart |
| 2,752,857 A | 7/1956 | White |
| 2,824,520 A | 2/1958 | Bartels |
| 2,855,141 A | 10/1958 | Van Rijn |
| 2,968,249 A | 1/1961 | Caine |
| 3,102,679 A | 9/1963 | Rudy |
| 3,135,212 A | 6/1964 | Todd |
| 3,364,866 A | 1/1968 | Sato |

(Continued)

FOREIGN PATENT DOCUMENTS

| | | |
|---|---|---|
| EP | 2626573 A1 | 8/2013 |
| WO | 9908366 A1 | 2/1999 |
| WO | 2010081123 A1 | 7/2010 |

OTHER PUBLICATIONS

PCT International Search Report & Written Opinion for Appl No. PCT/US2018/060690 dtd Mar. 12, 2019, 17 pages.

(Continued)

*Primary Examiner* — David E Sosnowski
*Assistant Examiner* — Jackson N Gillenwaters
(74) *Attorney, Agent, or Firm* — Maine Cernota & Curran

(57) ABSTRACT

A system and method of pumping low-density liquids, such as liquid hydrogen (LH2), includes a plurality of integrated motor/pump modules (IMPs) interconnected in series, each having a single IMP impeller. A controller separately adjusts the speeds of the IMP impellers such that a specified head of the pumping system is achieved, while a critical NPSH_c of each IMP remains below its NPSH_A. The IMPs can be identical, and the controller can cause all of the impellers to rotate at the same speed, except for any that require a speed reduction to ensure that its NPSH_c remains below its NPSH_A. The IMPs can comprise induction coils or permanent magnets attached to the impellers that pass in proximate radial or axial alignment with stator coils. The IMPs can be controlled by variable frequency drives (VFDs). A cooling system can transfer heat from within the IMP to an external heat destination.

20 Claims, 8 Drawing Sheets

(56) References Cited

U.S. PATENT DOCUMENTS

| | | | |
|---|---|---|---|
| 3,868,196 | A | 2/1975 | Lown |
| 4,213,745 | A | 7/1980 | Roberts |
| 4,508,998 | A | 4/1985 | Hahn |
| 4,806,080 | A | 2/1989 | Mizobuchi |
| 5,117,141 | A | 5/1992 | Hawsey |
| 5,158,440 | A | 10/1992 | Cooper |
| 5,269,664 | A | 12/1993 | Buse |
| 5,332,374 | A | 7/1994 | Kricker |
| 5,494,418 | A | 2/1996 | Moriya |
| 5,567,133 | A | 10/1996 | Kobaybashi |
| 5,697,767 | A * | 12/1997 | Bissell .................. F04D 13/14 417/409 |
| 5,713,727 | A | 2/1998 | Veronesi et al. |
| 6,012,909 | A | 1/2000 | Sloteman |
| 6,034,465 | A | 3/2000 | Mckee |
| 6,056,518 | A | 5/2000 | Allen |
| 6,135,098 | A | 10/2000 | Allen |
| 6,175,173 | B1 | 1/2001 | Stephan |
| 6,422,838 | B1 | 7/2002 | Sloteman |
| 6,835,051 | B2 | 12/2004 | Heim |
| 7,067,950 | B2 | 6/2006 | Hirzel |
| 8,303,268 | B2 | 11/2012 | Werson |
| 11,323,003 | B2 | 5/2022 | Judge |
| 2002/0035974 | A1 | 3/2002 | Pawellek |
| 2002/0106290 | A1 | 8/2002 | Bader |
| 2003/0021683 | A1 | 1/2003 | Capone |
| 2004/0013547 | A1 | 1/2004 | Allen |
| 2005/0196269 | A1 | 9/2005 | Racer |
| 2007/0048158 | A1 | 3/2007 | Kochan, Jr. |
| 2008/0288115 | A1 * | 11/2008 | Rusnak ............... F04D 15/0066 700/282 |
| 2009/0208349 | A1 | 7/2009 | Eller |
| 2011/0164995 | A1 | 7/2011 | Genster |
| 2011/0238172 | A1 | 9/2011 | Akdis |
| 2011/0318175 | A1 | 12/2011 | Converse |
| 2013/0028760 | A1 | 1/2013 | Lin |
| 2013/0213325 | A1 | 8/2013 | Kim |
| 2013/0236341 | A1 | 9/2013 | Anderson |
| 2015/0104335 | A1 | 4/2015 | Faller |
| 2016/0006379 | A1 | 1/2016 | Wang et al. |
| 2016/0072362 | A1 | 3/2016 | Kube |
| 2016/0305447 | A1 | 10/2016 | Dreiss et al. |
| 2019/0120249 | A1 * | 4/2019 | Judge ..................... F04D 13/14 |
| 2019/0145428 | A1 | 5/2019 | Judge et al. |
| 2020/0067376 | A1 * | 2/2020 | Judge ....................... F04D 1/08 |
| 2023/0081667 | A1 * | 3/2023 | Alkad ................ F04D 15/0218 417/36 |

OTHER PUBLICATIONS

Office Action for U.S. Appl. No. 16/204,997 dated Jul. 2, 2020, 6 Pages.
Office Action for U.S. Appl. No. 16/668,665, dated Dec. 4, 2020, 6 Pages.
Office Action for U.S. Appl. No. 16/668,665, dated Jan. 15, 2021, 50 Pages.
International Search Report and Written Opinion for PCT Appl. No. PCT/US2020/056972, mail date Feb. 17, 2021, 11 Pages.
Office Action for U.S. Appl. No. 16/668,665, dated May 3, 2021, 27 Pages.
Advisory Action for U.S. Appl. No. 16/668,665 mail date Jul. 14, 2021, 5 pages.
Notice of Allowance for U.S. Appl. No. 16/668,665 mail date Feb. 22, 2022, 17 Pages.
International Preliminary Report on Patentability for PCT Appl. No. PCT/US2020056972 Mail Date May 12, 2022, 8 pages.
Office Action for India Appl. No. 202217025766, dated Aug. 18, 2022, 7 Pages.
Extended European Search Report of EP Appl No. 20882691.7, mail date Nov. 11, 2022, 8 pages.
Office Action for JP application No. 2022-524573 mail date Jul. 18, 2023, 6 pages.

* cited by examiner

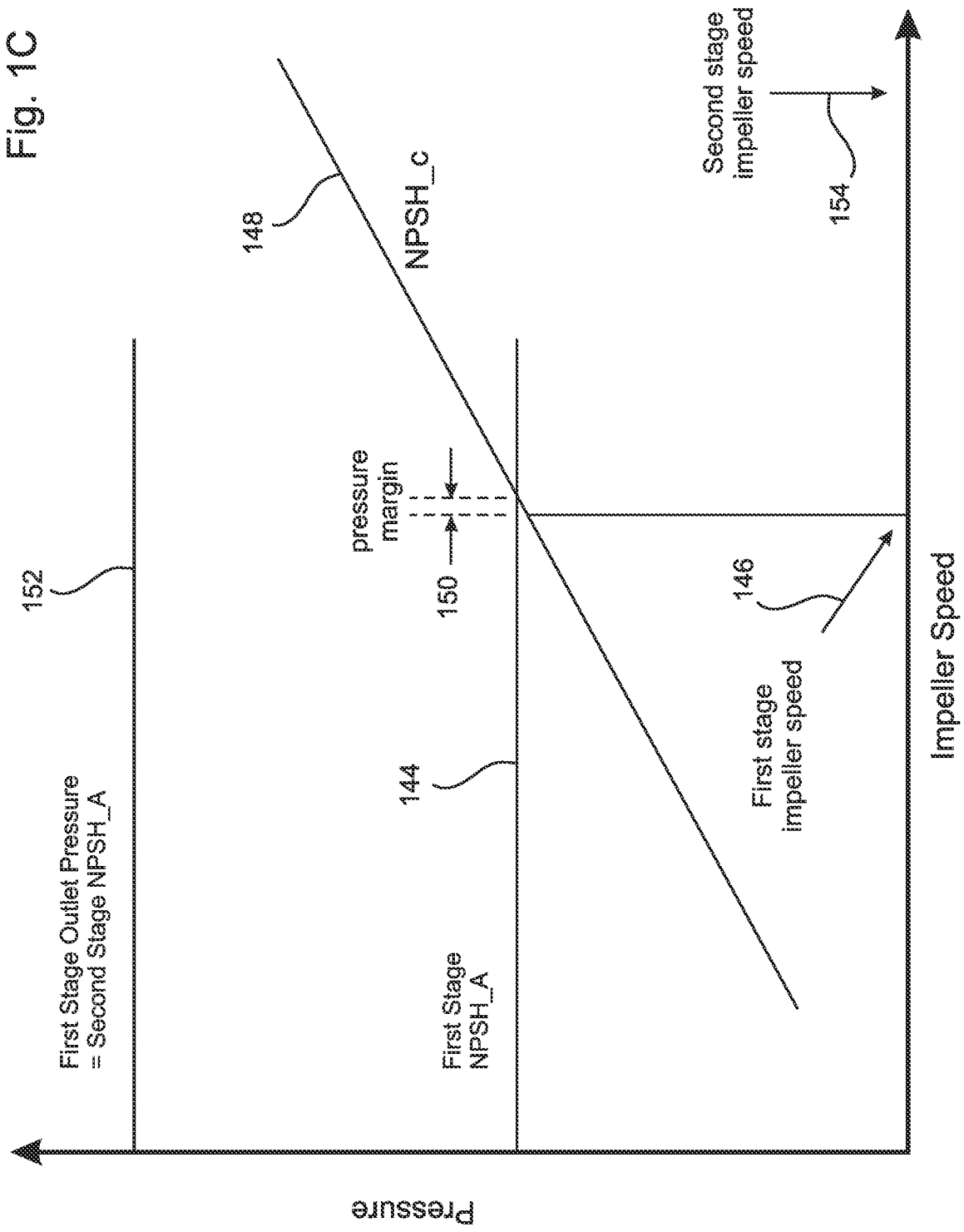

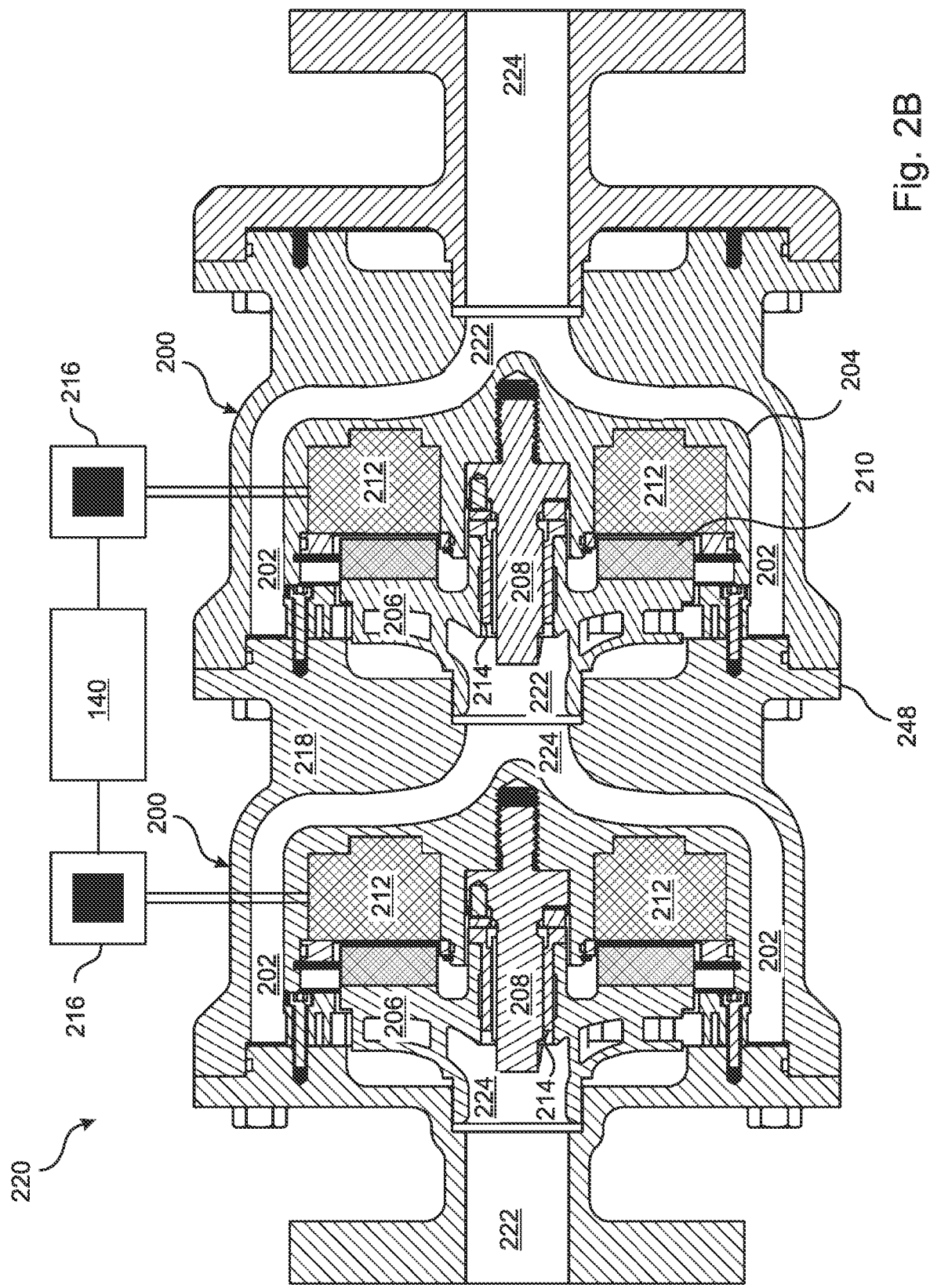

EFFICIENT SYSTEM FOR PUMPING LOW-DENSITY LIQUIDS

RELATED APPLICATIONS

This application is related to U.S. Pat. No. 11,323,003, issued on May 3, 2022, which is herein incorporated by reference in its entirety for all purposes. This application is also related to the U.S. patent application Ser. No. 18/438,039, also by the present Applicant and filed concurrently with this application on Feb. 9, 20224, which is herein incorporated by reference in its entirety for all purposes.

FIELD OF THE INVENTION

The invention relates to pumps, and more particularly, to pumps configured for pumping low-density liquids.

BACKGROUND OF THE INVENTION

The collection, transport, and distribution of liquid hydrogen (LH2) is of increasing importance, due to the growing use of hydrogen as a fuel supply. In particular, "green" hydrogen is expected to play a critical role in reducing carbon emissions over the next few decades. The term "green" hydrogen refers to hydrogen that is produced using renewable clean energy sources, such as solar power and wind power.

Renewable energy generators, such as windmills and solar panels, can sometimes be installed proximate energy consumption locations, such as placing solar panels on the roof of a building or installing a windmill next to a factory. However, this approach is limited, due to siting constraints and economies of scale. Instead, it is often preferable to construct large green energy facilities in optimal locations, such as large solar panel arrays in deserts or windmill farms in coastal waters, and then to convey their power output to remote locations of energy consumption. In addition to taking advantage of favorable environments, and gaining economy of scale, this approach has the advantage of being able to utilize existing electrical power distribution networks to benefit larger numbers of energy consumers. However, it remains necessary to site such facilities near the electrical grids of consumers.

Instead, with reference to FIG. 1A, green energy produced 102 at a remote location 100 that includes a source of water 104 can be used to generate hydrogen gas via hydrolysis 106. The hydrogen gas is compressed 108, and can be distributed to electrical generation plants wherever it is needed, in a manner similar to natural gas distribution. As with natural gas, it is often more efficient to liquefy 110 hydrogen gas before it is transported 116, thereby eliminating safety concerns associated with gas pressurization, and enabling an increased energy density to be enclosed within a given container space. Typically, the LH2 is stored 112, and then transferred 114 to ships, train cars, or trucks as needed. Finally, after the LH2 has been shipped 116 to an import location 118, it is transferred 120 and stored 122 in a storage container, from which it can be transferred to local energy generating plants, e.g. by trucks 124.

Distributing liquid hydrogen in this manner requires that the LH2 be pumped from the liquification apparatus 110 into a storage container 112, and then unloaded 114 and pumped to a container of a ship or other transport vehicle 116. The LH2 is then pumped from the transporting vehicle 116 to an import storage container 120, and finally it is pumped from local storage 122 to local distribution vehicles 124 such as trucks. Energy efficient pumping of LH2 is therefore a critical requirement of the green hydrogen approach to distributing renewable energy.

However, while liquification and distribution of LH2 is similar in many ways to the liquification and distribution of natural gas, the much lower density of LH2 as compared to LNG poses a significant efficiency challenge for centrifugal pumps, in that it significantly reduces the differential pressure generated by traditional centrifugal pump designs, because the differential pressure generated by a centrifugal pump is proportional to the product of the pumped liquid density and the head generated by the pump. Accordingly, it can be desirable to significantly increase the head of a pump design so as to achieve a desired pressure difference when pumping a very low-density liquid such as LH2.

One approach is to implement a positive displacement pump instead of a centrifugal pump. However, positive displacement pumps, such as piston pumps, are difficult to implement at large sizes and flow volumes, tend to generate larger vibrations than centrifugal pumps, and can require significantly more monitoring and preventative maintenance to avoid failure and unplanned shut-down of the pump. Also, positive displacement pumps typically require a separate lubricant, rendering them difficult or impossible to employ when pumping a cryogenic low-density liquid. Furthermore, it is not possible to include a lubricant when pumping liquid hydrogen that will be used in fuel cells, due to the extreme sensitivity of fuel cells to impurities. Also, because LH2 is a poor lubricant, positive displacement pumps tend to seize or otherwise fail when pumping LH2.

There are two basic approaches that can be followed, separately or in combination, to increase the head that is generated by a centrifugal pump. One approach is to modify the impellers, for example by enlarging the impeller blades and/or adding additional impeller blades. However, this approach tends to be energy inefficient. A more desirable approach is to operate the pump at a higher speed, which can efficiently increase the pressure differential by taking advantage of the fact that the head generated by a centrifugal pump is proportional to the square of the impeller speed.

However, operating a centrifugal pump at very high speeds can be problematic. Typically, the motor that drives a centrifugal pump is "synchronous," in that its rotational speed is dictated by the line frequency of the electrical power source, typically 50 Hz or 60 Hz. Rotation of the pumping shaft at high speeds can be accomplished by implementing a gear set between the motor and the shaft, but this approach can reduce the reliability of the system and give rise to increased heat generation and maintenance requirements. Another approach is to use an adjustable speed drive (ASD), such as a brushless DC motor or a synchronous motor driven by a variable frequency drive (VFD), to drive the shaft at high speeds.

However, even if an ASD is used, the maximum speed of a pump can be limited by other factors. One difficulty is that high rotation speeds can excite resonance frequencies of the impeller shaft, especially if a plurality of impellers are attached to the rotating shaft in a multi-stage pump.

Another limitation is that, for any given operating rate, it will be necessary to maintain the available net positive suction head NPSH_A of the first pumping stage above a critical net positive suction head (NPSH_c), below which the efficiency of the first pumping stage will be reduced and cavitation may occur within the first pumping stage. The critical net positive suction head NPSH_c will vary with the rotation speed of the impeller, and will depend upon several factors, according to the specific application of the pumping system. One consideration is the NPSH_R (net positive suction head required), which is a value of the net positive suction head at which a defined drop in total dynamic head (TDH) will occur at a given flow condition. Typically, this is defined to be a 3% head drop NPSH3%. Often, cavitation will begin at NPSH_A values that are much higher than the NPSH_R. The suction head at which cavitation first begins is sometimes referred to as the "incipient" cavitation net positive suction head, or NPSH_i, which is the NPSH at which visible bubbles of gas begin to appear. NPSH_i can be three to five times higher than NPSH3%. In some embodiments, NPSH_c is defined to be the value of NPSH_A at which the NPSH margin ratio NPSH_A/NPSH_R reaches a certain critical value. The value of NPSH_c can also be affected by the effects of low NPSH_A on impeller life.

Accordingly, it is necessary to ensure that the impeller speed is not increased beyond the point where NPSH_c exceeds NPSH_A. For multi-stage pumps having a plurality of impellers rotated by a common shaft, the rotation speed of all of the impellers is thereby limited by the NPSH_c and NPSH_A of the first impeller, causing all of the impellers to operate at low efficiency.

When the inlet pressure of the pumped liquid is insufficient, a separate pre-pressurizing pump can be provided that is configured to deliver the low-density liquid to the inlet of the primary pump at a pressure that will prevent cavitation, even at high primary impeller speeds. However, this approach is expensive, and energy inefficient.

What is needed, therefore, is a centrifugal pumping system that can rotate its impellers at high speeds without exciting harmonic resonance frequencies, and without causing NPSH_c to exceed NPSH_A for any of the impellers in the pumping system.

SUMMARY OF THE INVENTION

The present invention is a centrifugal pumping system that can rotate its impellers at high speeds without exciting harmonic resonance frequencies, and without causing NPSH_c to exceed NPSH_A for any of the impellers in the pumping system.

The disclosed pumping system comprises at least two integrated motor pump (IMP) modules, where each of the IMP modules functions as a pumping stage of the pumping system. Each IMP module includes an impeller and a shaft, where the impeller is driven by an adjustable speed drive (ASD), such as a brushless DC motor or a synchronous motor driven by a variable frequency drive (VFD). Accordingly, the impeller rotation speed of each pumping stage is separately variable and controlled. In embodiments, all of the IMP modules are substantially identical to each other. In various embodiments, an arbitrary number of IMP modules can be directly interconnected with no intervening conduits.

According to the present invention, if the liquid inlet pressure is high, the required head of the pumping system can be proportionally divided among the IMP modules. In embodiments where all of the IMP modules are substantially identical, the required head can be divided equally among the IMP modules, and all of the IMP module impellers can operate at the same speed.

However, if the NPSH_A of the first IMP module, is low, then the first IMP module is operated at a lower speed, which in embodiments is chosen so that NPSH_c is slightly below the available inlet pressure NPSH_A of the liquid. The second IMP module is then able to operate at any desired speed, so long as its NPSH_c does not exceed its NPSH_A, which is the outlet pressure of the first IMP module. In embodiments where there are more than two IMP modules, the impeller speed of each IMP module beyond the first one is limited only by its NPSH_A, i.e. the output pressure of the preceding module. Even in extreme cases, such as when pumping LH2 at a very low inlet pressure, in embodiments this approach can allow all but the first few IMP modules, and in embodiments all but the first IMP module, to operate at speeds above 4000 RPM, and in embodiments above 10,000 RPM, or even above 20,000 RPM. or more, without NPSH_c exceeding NPSH_A for any of the modules.

In certain embodiments, the IMP modules are similar to the "sealless" motor pump modules disclosed by U.S. Pat. No. 11,323,003, also by the present applicant, which is herein incorporated by reference in its entirety for all purposes. In these embodiments, instead of requiring a separate motor and rotating shaft, each of the IMP modules comprises a plurality of induction coils or permanent magnets cooperative with an impeller, and a stator housing containing stator coils that are positioned in opposition to the permanent magnets. The stator coils are energized by an adjustable speed drive (ASD), such as a variable frequency drive (VFD), that is actuated by a controller. The induction coils or magnets and stator coils function cooperatively together as a "direct drive" motor that applies rotational torque directly to the impeller. In embodiments, the impeller is mounted by a bearing to a fixed, non-rotating shaft or "stud." In some embodiments, the bearing is product-lubricated. When applied, for example, to LH2, the low dynamic viscosity of LH2 minimizes friction losses of the stator-rotor gap and the bearing.

Accordingly, in these embodiments the only rotating elements in the IMP module are the impeller and its associated bearing and magnets, which collectively constitute the "rotor." By providing an extremely stiff rotor/shaft configuration, in which the shaft is very short and does not rotate, the resulting rotor and stator harmonic frequencies, sometimes referred to as "Eigenfrequencies," are very high in these embodiments, such that the rotor can operate at very high rotation speeds that are nevertheless below the resonance frequencies of the rotor or stator, even when the rotor is operated at rates above 4000 RPM, and in embodiments above 10,000 RPM, or even above 20,000 RPM.

A first general aspect of the present invention is a pumping system configured for pumping a process liquid. The pumping system includes a controller and a plurality of centrifugal integrated pumping modules (IMPs). Each of the IMPs includes an inlet, an outlet, a shaft, an impeller configured to rotate with or about the shaft, and an adjustable speed drive (ASD) configured to cause the impeller to rotate at a rotation speed that is specified by the controller, thereby pumping the process liquid from the inlet to the outlet. The rotation speeds of the impellers are thereby separately controlled by the controller. For each of the IMPs except a last of the IMPs, the outlet of the IMP is in fluid communication with the inlet of a next one of the IMPs.

The controller is configured to adjust the speeds of the impellers of each of the IMPs such that a specified head of the pumping system is achieved, while for each of the IMPs, a critical inlet pressure NPSH_c of the IMP remains below an available inlet pressure NPSH_A of the IMP.

In embodiments, all of the IMPs are substantially identical to each other. In some of these embodiments, the controller is configured to cause all of the impellers of the IMPs to rotate at the same speed, except for any of the IMPs that requires a reduction of its impeller speed to ensure that its NPSH_c remains below its NPSH_A.

In any of the above embodiments, for each of the IMPs except a first of the IMPs, the inlet of the IMP can be in physical contact and juncture with the outlet of the preceding IMP. In some of these embodiments, the inlet of each of the IMPs except the first of the IMPs is inserted into the outlet of a previous one of the IMPs, or the outlet of each of the IMPs except a last of the IMPs is inserted into the inlet of a next one of the IMPs.

In any of the above embodiments, at least one of the ASDs can be a variable frequency drive (VFD).

In any of the above embodiments, each of the IMPs can further include a module housing, a stator within the module housing, the stator comprising a plurality of stator coils, and a plurality of induction coils or permanent magnets fixed to the impeller and configured to pass in proximate alignment with the stator coils when the impeller rotates. In some of these embodiments, the shaft is a non-rotating shaft that is fixed to the module housing, and the impeller comprises an impeller bearing that enables the impeller to rotate about the non-rotating shaft. In some of these embodiments for at least one of the IMPs, the impeller bearing is lubricated by the process liquid. In any of these embodiments, for at least one of the IMPs, the plurality of induction coils or permanent magnets can be configured to pass in proximate radial alignment with the stator coils when the impeller rotates, or the plurality of induction coils or permanent magnets are configured to pass in proximate axial alignment with the stator coils when the impeller rotates.

In any of the above embodiments, the process liquid can be liquid hydrogen (LH2).

In any of the above embodiments, at least one of the IMPs can further include a cooling system configure to transfer heat from process liquid within the IMP to a heat destination external to the module housing.

A second general aspect of the present invention is a method of efficiently pumping a process liquid from a source location to a destination location. The method includes providing a pumping system according to the first general aspect, directing the process liquid from the source location to the input of a first of the IMPs, directing the output of a last of the IMPs to the destination location, and causing the impellers of the IMPs to rotate at rotating speeds that cause the pumping system to achieve a specified head, while the NPSH_c of each of the IMPs remains below the NPSH_A of the IMP.

In embodiments, the process liquid is liquid hydrogen (LH2).

In any of the above embodiments, all of the IMPs can be substantially identical to each other. In some of these embodiments, the controller is configured to cause all of the impellers of the IMPs to rotate at the same speed, except for any of the IMPs that requires a reduction of its impeller speed to ensure that its NPSH_c remains below its NPSH_A.

In any of the above embodiments, each of the IMPs can further include a module housing, a stator within the module housing, the stator comprising a plurality of stator coils, and a plurality of induction coils or permanent magnets fixed to the impeller and configured to pass in proximate alignment with the stator coils when the impeller rotates, wherein the shaft is a non-rotating shaft that is fixed to the module housing, and the impeller comprises an impeller bearing that enables the impeller to rotate about the non-rotating shaft.

In any of the above embodiments, for at least one of the IMPs the plurality of induction coils or permanent magnets can be configured to pass in proximate radial alignment with the stator coils when the impeller rotates.

And in any of the above embodiments, for at least one of the IMPs, the plurality of induction coils or permanent magnets can be configured to pass in proximate axial alignment with the stator coils when the impeller rotates.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1C is a graph that illustrates impeller rotation speeds for an embodiment of the present inventio that includes two IMP modules;

FIG. 2B is a cross-sectional illustration, drawn to scale, of an embodiment of the present invention that includes two IMP modules, in which permanent magnets are attached to the impellers, and stator coils are axially aligned with the permanent magnets;

DETAILED DESCRIPTION

The present invention is a centrifugal pumping system that can rotate its impellers at high speeds without exciting harmonic resonance frequencies, and without causing NPSH_c to exceed NPSH_A for any of the impellers in the pumping system.

Figure 1A:
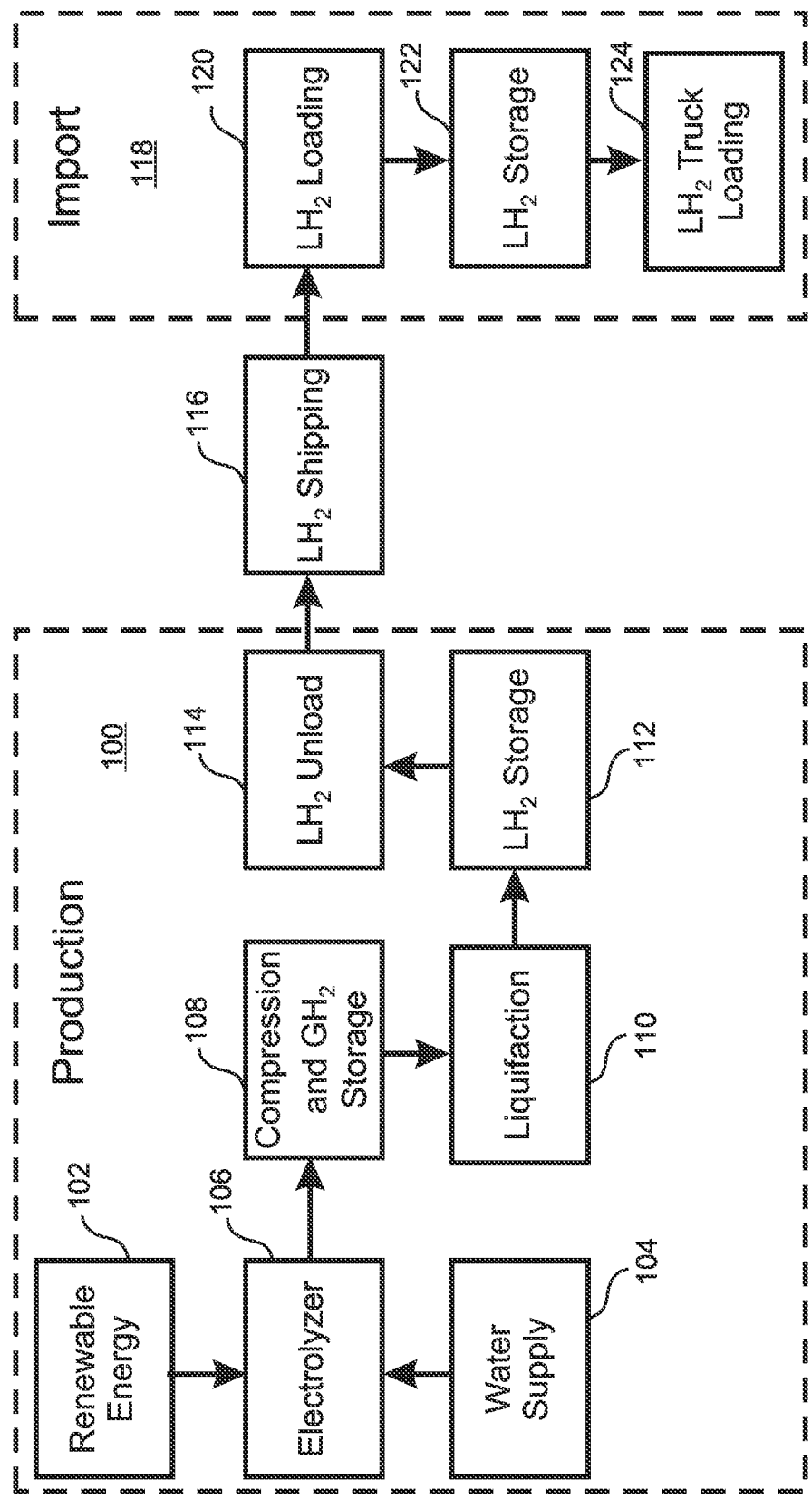
FIG. 1A is a flow diagram illustrating the use of liquid hydrogen in the prior art as a medium for transferring energy from a green energy production site to an energy consumption location.
Figure 1B:
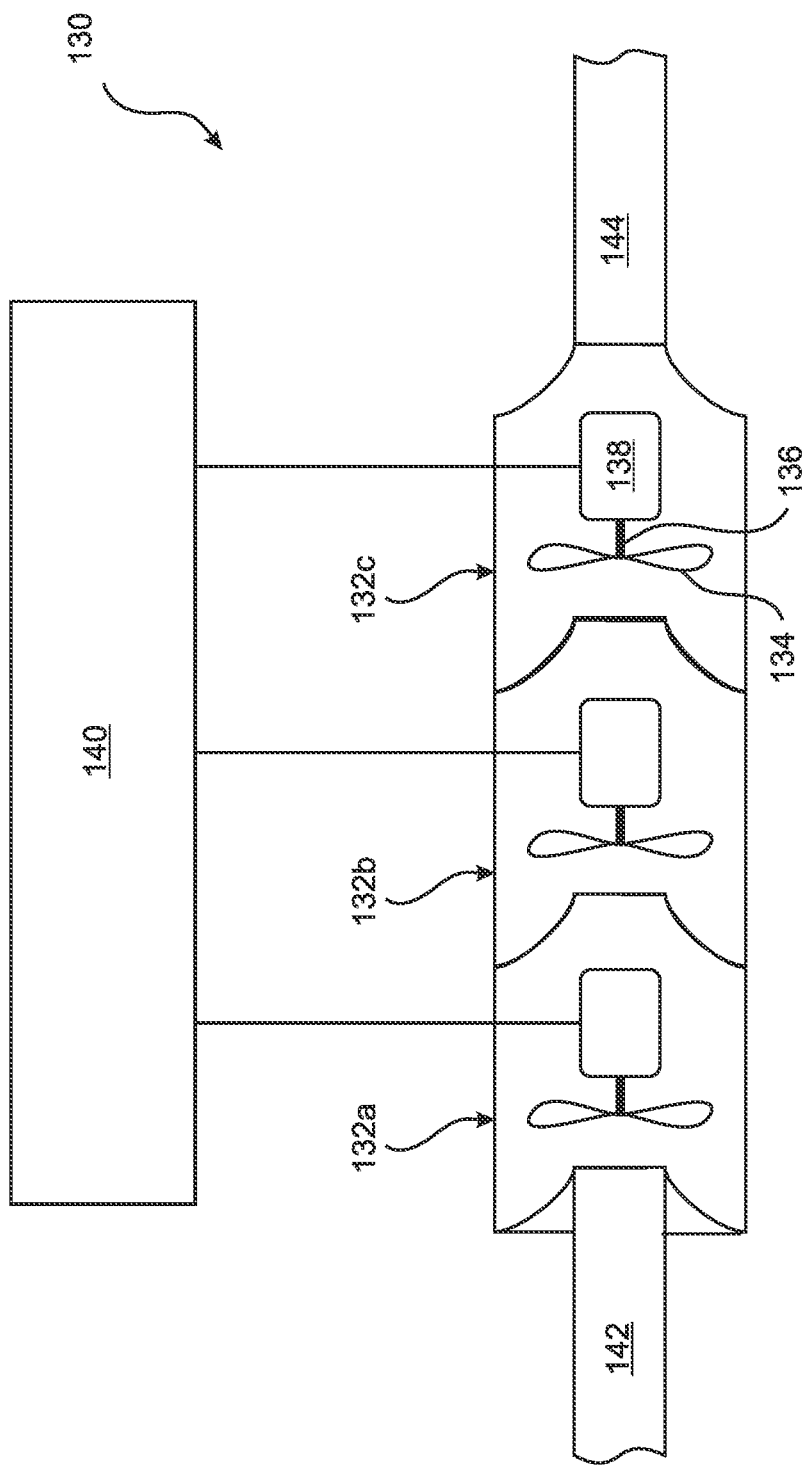
FIG. 1B is a block diagram of a plurality of integrated motor pump (IMP) modules connected in series, according to an embodiment of the present invention.

With reference to FIG. 1B, the disclosed pumping system 130 comprises a plurality of integrated motor pump (IMP) modules 132a-c, collectively 132, connected in series, where each of the IMP modules 132 functions as a separate pumping stage of the pumping system 130. Each IMP module 132 includes an impeller 134 and a shaft 136, where the impeller is driven by an adjustable speed drive (ASD) 138, such as a brushless DC motor or a synchronous motor driven by a variable frequency drive (VFD). Accordingly, the impeller rotation speed of each pumping stage 132 is separately variable and controlled by a controller 140. In embodiments, all of the IMP modules 132 are substantially identical to each other. In various embodiments, an arbitrary number of IMP modules 132 can be directly interconnected with no intervening conduits.

According to the present invention, if the liquid pressure at the inlet 142 of the first IMP 132a is high, the required head of the pumping system 130 can be proportionally divided among the IMP modules 132. In embodiments where all of the IMP modules are substantially identical, the required head can be divided equally among the IMP modules 132, and all of the IMP module impellers 134 can operate at the same speed. For example, in the 3-stage embodiment of FIG. 1B, if the inlet pressure is sufficiently high each stage can be used to produce one third of the required head at the outlet 144 of the system 130.

With reference to FIG. 1C, if the liquid pressure at the inlet 142 is low, then the first IMP module is 132a is operated at a lower speed 146, which in embodiments is chosen so that a specified "critical" NPSH, referred to herein as NPSH_c 148, of the first IMP module 132a is slightly below the inlet pressure NPSH_A 144 of the process liquid. In FIG. 1C, the pressure difference between the selected NPSH_c 148 and the inlet pressure NPSH_A 144 is indicated as the "pressure margin" 150. The second IMP module 132b is then able to operate at any desired speed 154, so long as its NPSH_c 148 does not exceed its NPSH_A, which is the outlet pressure 152 of the first IMP module 132a. In embodiments where there are more than two IMP modules 132, the impeller speed of each IMP module 132 beyond the first one 132a is limited only by its NPSH_c and its NPSH_A, which is the output pressure of the previous module. Even in extreme cases, such as when pumping LH2 at a very low inlet pressure, in embodiments this approach can allow all but the first few IMP modules 132, and in embodiments all but the first IMP module 132a, to operate at speeds above 4000 RPM, and in embodiments above 10,000 RPM, or even above 20,000 RPM. or more, without risking cavitation.

Figure 2A:
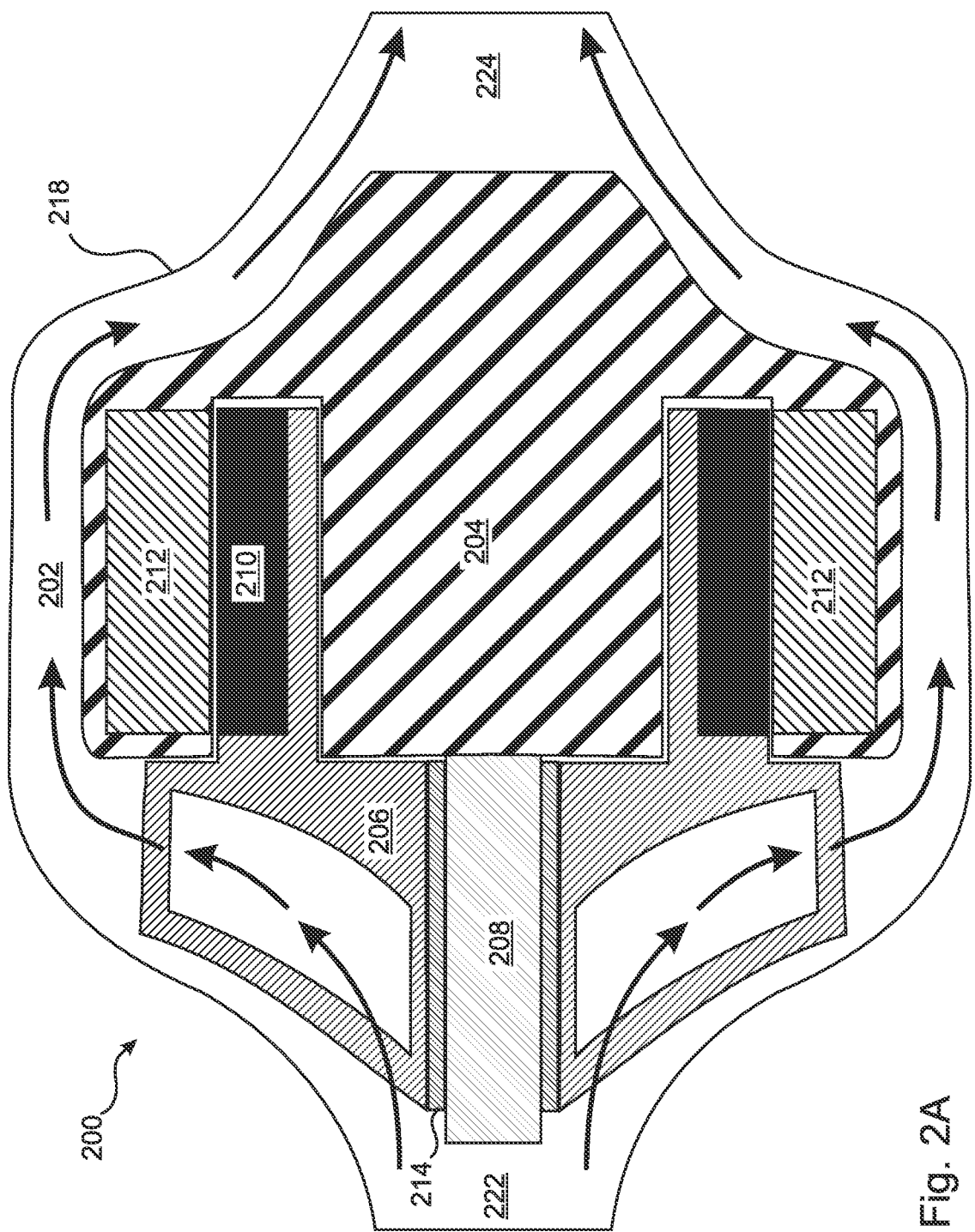
FIG. 2A is a cross-sectional illustration of an IMP module in an embodiment of the present invention in which permanent magnets are attached to the impellers, and stator coils are radially aligned with the permanent magnets.

With reference to FIG. 2A, in certain embodiments the IMP modules 132 are similar to the "sealless" motor pump modules disclosed by U.S. Pat. No. 11,323,003, also by the present applicant, which is herein incorporated by reference in its entirety for all purposes. In these embodiments, instead of requiring a separate motor 138 and rotating shaft 136, each of the IMP modules 200 comprises a stator housing 204 surrounding stator coils 212. The stator housing 204, in turn, is surrounded by a housing 218 of the module 200. In embodiments, the low-density liquid that is pumped by the module 200 is distributed about an annular space 202 that is formed between the stator housing 204 and the module housing 218 as it flows from the inlet 222 to the outlet 224.

Figure 2C:
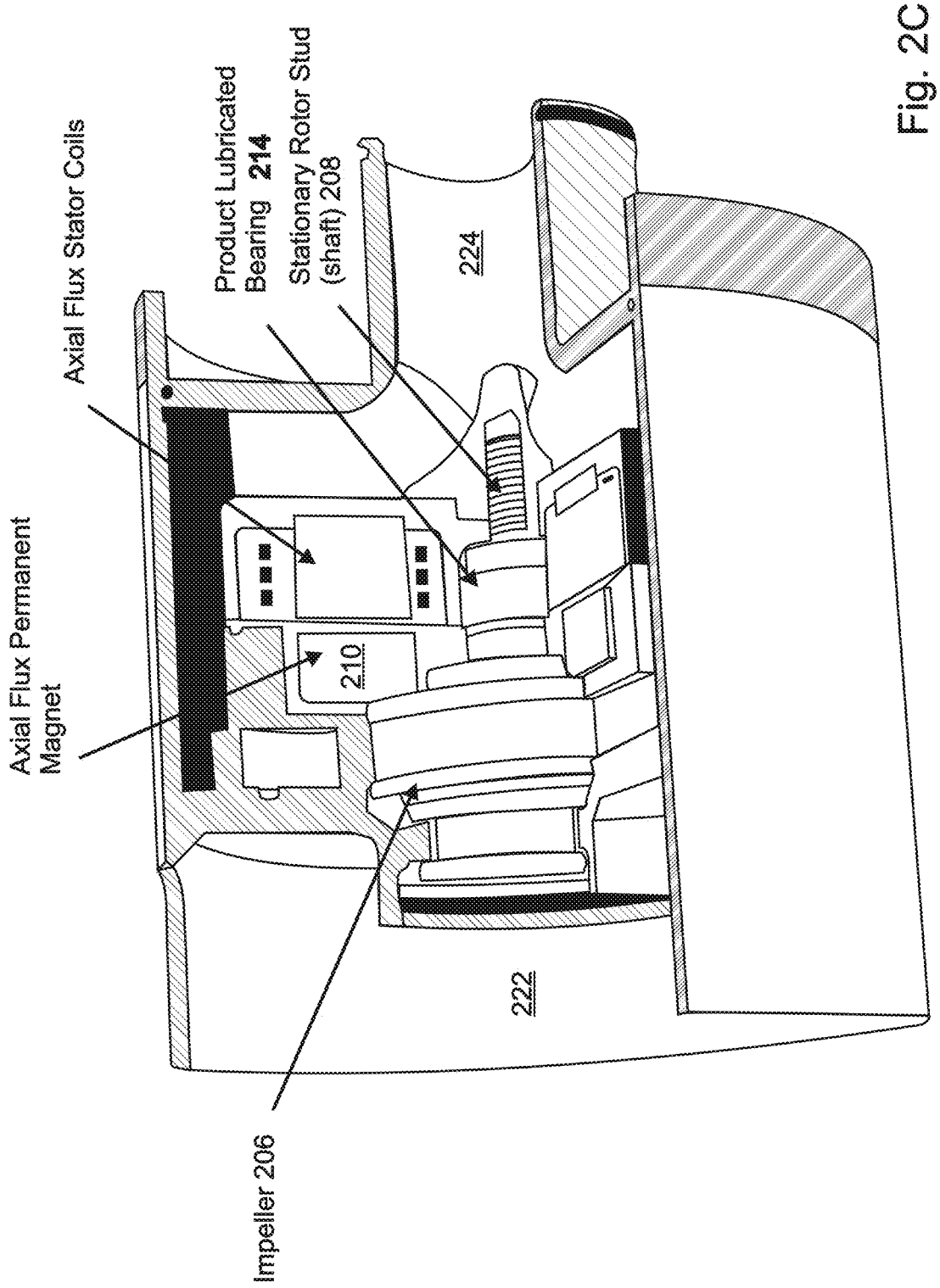
FIG. 2C is a cutaway perspective view, drawn to scale, of a single IMP module in an embodiment that is similar to FIG. 2B.

The IMP module 200 in these embodiments further comprises an impeller 206 that rotates about a shaft 208, which can be a non-rotating shaft or "stud" 208. In the illustrated embodiment, a plurality of permanent magnets 210 are fixed to the impeller 206, and are caused as the impeller 206 is rotated to pass close to the electromagnetic stator coils 212 provided within the stator housing 204. Torque is thereby transmitted directly from the stator coils 212 to the impeller 206 without the use of a rotating shaft. In similar embodiments, instead of permanent magnets 210, a plurality of induction coils are fixed to the impeller 206. The induction coils or permanent magnets 210 and the stator coils 212 can be radially aligned, as in the embodiment of FIG. 2A, or axially aligned, as in the embodiments of FIGS. 2B and 2C.

With reference to FIG. 2B, a plurality of pumping stages can be provided by concatenating a plurality of the IMP modules 200. In the illustrated embodiment, the IMP modules 200 are configured for direct and compact interconnection, with the input 222 of each module being directly inserted into the output 224 of a preceding module, so that no intervening conduits are required. An arbitrary number of pumping stages 200 can be provided in this way. In particular, because each module 200 includes its own separate shaft 208, which can be a non-rotating stud 208, high stage counts do not raise any issues regarding shaft size, shaft deflection, roto-dynamics, bearing loads, motor alignment, or alignment between stages.

In the illustrated embodiments, the impeller 206 is supported and fixed axially and radially by a product-lubricated bearing 214. Using the working liquid (process fluid) as a lubricant for the bearings 214, in embodiments, eliminates the need for an external oil lubrication system and greatly simplifies the overall pump design and maintenance, especially when pumping a cryogenic liquid such as LH2. Also, pumping a low dynamic viscosity working liquid, such as LH2, minimizes friction losses of the bearings 214 and in the gap between the rotor and the stator.

According to the present invention, an adjustable speed drive 216, such as a variable frequency drive, provides energy to the stator coils 212 and causes the impeller 206 to rotate at a high speed, which in embodiments can be higher than 4000 RPM, and in embodiments above 10,000 RPM, or even above 20,000 RPM. or more. Due to this direct, variable control of the impeller speed by the controller 140 via the ASD 216, a gear set is not required.

Accordingly, in embodiments, the only rotating elements in the IMP module are the impeller 206 with its associated magnets 210, and in embodiments the bearing 214, which collectively constitute the "rotor." By providing an extremely stiff rotor/shaft configuration in which the shaft 208, in embodiments, is a stud that does not rotate, the resulting rotor harmonic frequencies, sometimes referred to as the "Eigenfrequencies," are very high, such that the rotor can operate at very high rotation speeds that are nevertheless below the resonance frequencies of the rotor and stator.

Figure 3A:
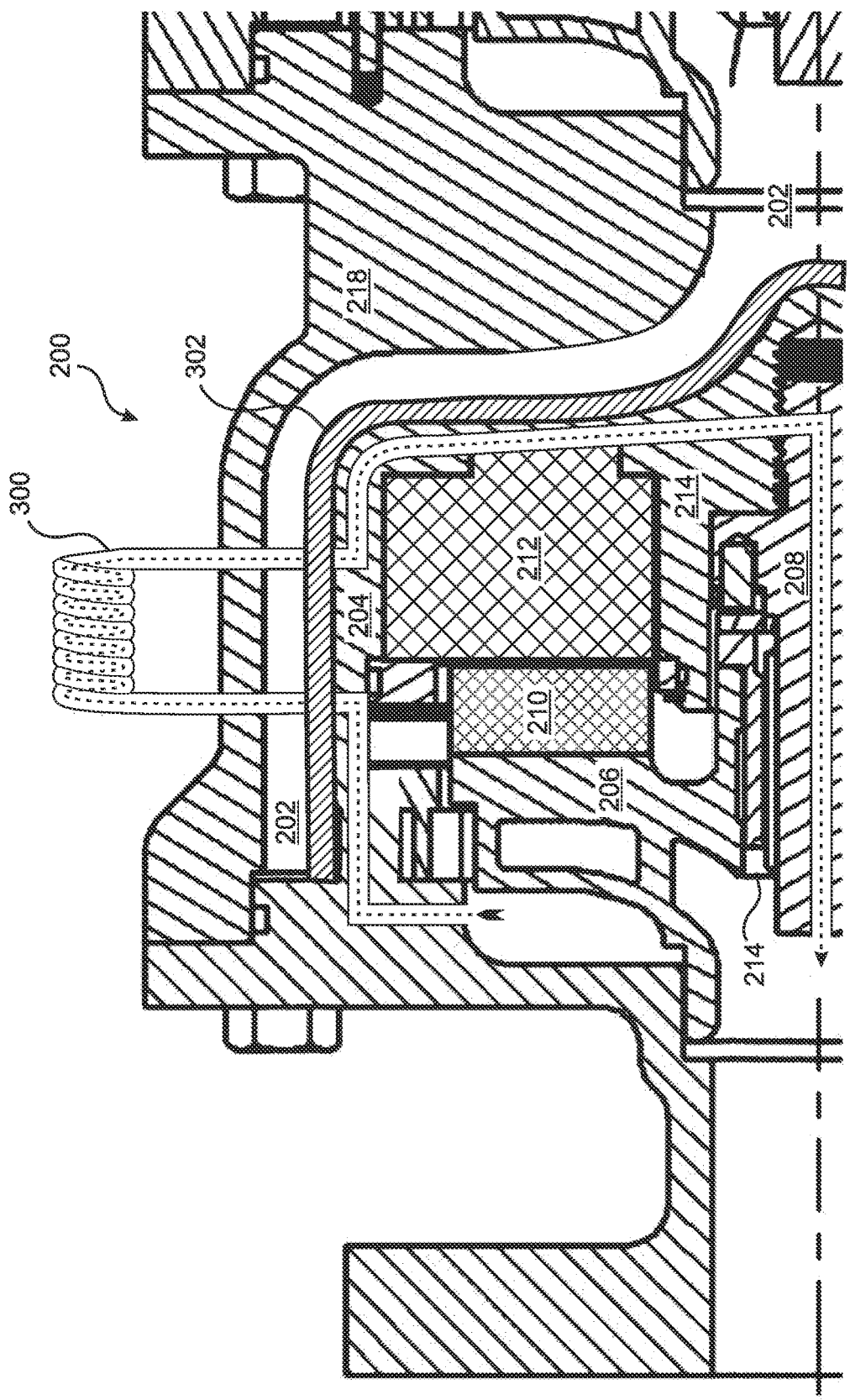
FIG. 3A is a cross-sectional view of an IMP module in which a small amount of the working fluid is diverted through a separate cooling path, where it is cooled, and then circulated in thermal contact with the stator housing according to an embodiment of the present invention.

In embodiments, the stator housing 204 is cooled by the process liquid at it flows through the annular passage 202 that surrounds the stator 204. With reference to FIG. 3A, some embodiments include insulation 302 surrounding the stator housing 204, and a small amount of the working fluid (process fluid) is diverted through a separate cooling path 300, where it is cooled and then circulated through the stator housing 204 to cool the stator coils 212. In similar embodiments, a separate cooling fluid, such as water or a cooling oil, is circulated through the cooling path 300 without diverting any of the working fluid. Fluid cooling of the stator coils 212, in various embodiments, allows the pumping system to operate with high temperature liquids.

Figure 3B:
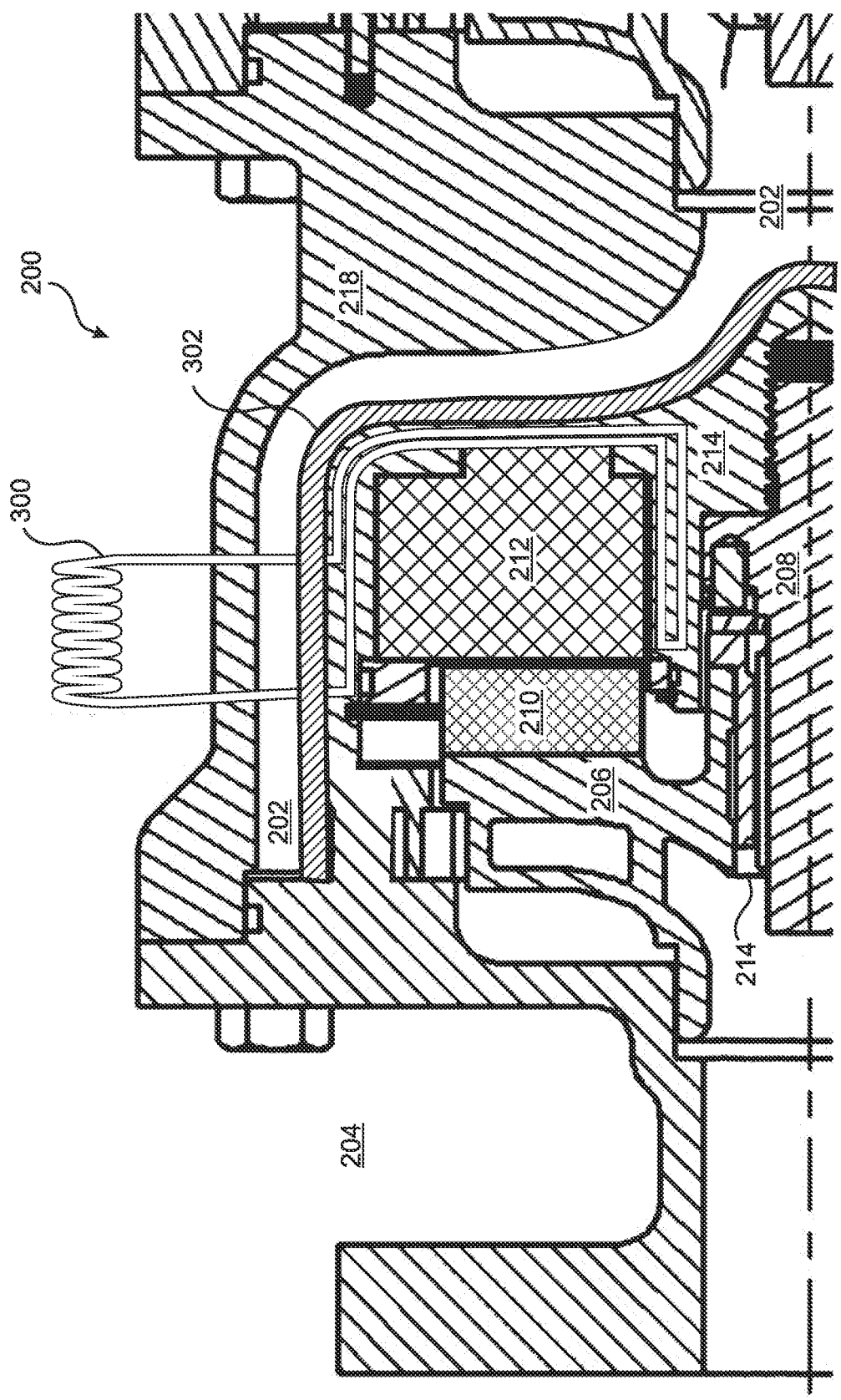
FIG. 3B is a cross-sectional view of an IMP module that is configured for submersion in a cryogenic liquid that is being pumped, such as LH2, in which a heat exchanger cools the stator and dissipates heat into the surrounding cryogenic liquid according to an embodiment of the present invention.

With reference to FIG. 3B, other embodiments that are configured for submersion in a cryogenic liquid that is being pumped, such as LH2, can include insulation 302 surrounding the stator housing 204, and a closed-circuit cooling path and heat exchanger 300 that cools the stator housing 204 and dissipates heat into the surrounding cryogenic liquid, thereby reducing any tendency for heat from the stator to vaporize liquid cryogen within the pump module 200. According to this approach, any convenient fluid can be circulated within the cooling path 300.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A pumping system configured for pumping a process liquid, the pumping system comprising:
    a controller; and
    a plurality of at least three centrifugal integrated pumping modules IMPs comprising a first IMP, a second IMP, and a last IMP, each of the IMPs comprising:
        a module housing;
        an inlet;
        an outlet;
        a non-rotating shaft;
        an impeller configured to rotate about the non-rotating shaft;
        an impeller bearing that enables the impeller to rotate about the non-rotating shaft; and
        an adjustable speed drive configured to cause the impeller to rotate at a rotation speed that is specified by the controller, thereby pumping the process liquid from the inlet to the outlet;
    wherein for each of the IMPs except the last IMP, the outlet of the IMP is in fluid communication with the inlet of a next one of the IMPs;
    wherein the rotation speeds of the impellers are separately controlled by the controller; and
    wherein the controller is configured to adjust the rotation speeds of the impellers of each of the IMPs such that for each of the first and second IMPs, the impeller rotation speed is a maximum rotation speed of the IMP at which a critical inlet pressure NPSH_c of the IMP is equal to an available inlet pressure NPSH_A of the IMP minus a pressure margin that is applicable to the IMP, and for at least the last IMP, the rotation speed of the impeller is at least 10,000 rpm.

2. The pumping system of claim 1, wherein all of the IMPs are identical to each other.

3. The pumping system of claim 2, wherein the controller is configured to cause all of the impellers of the IMPs to rotate at the same rotation speed, except for any of the IMPs that requires a reduction of the rotation speed of its impeller to ensure that its NPSH_c remains below its NPSH_A.

4. The pumping system of claim 1, wherein for each of the IMPs except a first of the IMPs, the inlet of the IMP is in physical contact and juncture with the outlet of the preceding IMP.

5. The pumping system of claim 4, wherein the inlet of each of the IMPs except the first of the IMPs is inserted into the outlet of a previous one of the IMPs, or the outlet of each of the IMPs except a last of the IMPs is inserted into the inlet of a next one of the IMPs.

6. The pumping system of claim 1, wherein at least one of the adjustable speed drives is a variable frequency drive.

7. The pumping system of claim 1, wherein each of the IMPs further comprises:
    a stator within the module housing, the stator comprising a plurality of stator coils; and
    a plurality of induction coils or permanent magnets fixed to the impeller and configured to pass in proximate alignment with the stator coils when the impeller rotates.

8. The pumping system of claim 7, wherein the shaft is fixed to the module housing.

9. The pumping system of claim 8, wherein for at least one of the IMPs the impeller bearing is lubricated by the process liquid.

10. The pumping system of claim 7, wherein for at least one of the IMPs the plurality of induction coils or permanent magnets are configured to pass in proximate radial alignment with the stator coils when the impeller rotates.

11. The pumping system of claim 7, wherein for at least one of the IMPs the plurality of induction coils or permanent magnets are configured to pass in proximate axial alignment with the stator coils when the impeller rotates.

12. The pumping system of claim 1, wherein the process liquid is liquid hydrogen.

13. The pumping system of claim 1, wherein at least one of the IMPs further comprises a cooling system configured to transfer heat from process liquid within the IMP to a heat destination external to the module housing of the IMP.

14. A method of efficiently pumping a process liquid from a source location to a destination location, the method comprising:
    providing a pumping system according to claim 1;
    directing the process liquid from the source location to the input of the first IMP;
    directing the output of the last IMP to the destination location;
    causing the impellers of the first and second IMPs to rotate respectively at rotation speeds at which the critical inlet pressures NPSH_c of the first and second IMPs are equal to the available inlet pressures NPSH_A of the first and second IMPs minus the pressure margins that are applicable to the first and second IMPs; and
    causing the impeller of the last IMP to rotate at an impeller rotation speed that is at least 10,000 rpm.

15. The method of claim 14, wherein the process liquid is liquid hydrogen.

16. The method of claim 14, wherein all of the IMPs are identical to each other.

17. The method of claim 16, wherein the controller is configured to cause all of the impellers of the IMPs to rotate at the same rotation speed, except for any of the IMPs that requires a reduction of the rotation speed of its impeller to ensure that its NPSH_c remains below its NPSH_A.

18. The method of claim 14, wherein each of the IMPs further comprises:
    a stator within the module housing, the stator comprising a plurality of stator coils; and
    a plurality of induction coils or permanent magnets fixed to the impeller and configured to pass in proximate alignment with the stator coils when the impeller rotates; and
    wherein the shaft is fixed to the module housing.

19. The method of claim 18, wherein for at least one of the IMPs the plurality of induction coils or permanent magnets are configured to pass in proximate radial alignment with the stator coils when the impeller rotates.

20. The method of claim 18, wherein for at least one of the IMPs the plurality of induction coils or permanent magnets are configured to pass in proximate axial alignment with the stator coils when the impeller rotates.

* * * * *